United States Patent [19]

Baba et al.

[11] Patent Number: 4,872,743

[45] Date of Patent: Oct. 10, 1989

[54] VARIFOCAL OPTICAL ELEMENT

[75] Inventors: Takeshi Baba; Kazuhiko Matsuoka; Masayuki Usui; Kazuo Minoura, all of Yokohama; Atsushi Someya, Machida; Masayuki Suzuki, Yokohama, all of Japan

[73] Assignee: Canon Kabushiki Kaisha, Tokyo, Japan

[21] Appl. No.: 144,643

[22] Filed: Jan. 11, 1988

Related U.S. Application Data

[60] Division of Ser. No. 943,837, Dec. 18, 1986, abandoned, which is a continuation of Ser. No. 600,959, Apr. 16, 1984, abandoned.

[30] Foreign Application Priority Data

Apr. 18, 1983 [JP] Japan ................................. 58-67026
Apr. 19, 1983 [JP] Japan ................................. 58-67713
Oct. 7, 1983 [JP] Japan ................................ 58-187859
Oct. 7, 1983 [JP] Japan ................................ 58-187860
Mar. 26, 1984 [JP] Japan ................................. 59-58011

[51] Int. Cl.$^4$ .......................... G02F 1/29; G02B 3/14
[52] U.S. Cl. .................................. 350/353; 219/539; 350/351; 350/354; 350/419
[58] Field of Search ............... 350/351, 353, 354, 379 350/413, 347 V, 418, 419; 219/50, 538, 539

[56] References Cited

U.S. PATENT DOCUMENTS

| | | | |
|---|---|---|---|
| 1,832,532 | 11/1931 | Church | 219/486 |
| 3,403,956 | 10/1968 | Miller | 350/353 |
| 3,434,779 | 3/1969 | Damen et al. | 350/353 |
| 3,609,584 | 9/1971 | Stitch et al. | 350/413 |
| 3,729,253 | 4/1973 | Moore et al. | 350/413 |
| 3,736,046 | 5/1973 | Zook | 350/393 |
| 4,099,046 | 7/1978 | Boynton et al. | 346/76 PH |
| 4,108,622 | 8/1978 | Martin | 350/379 |
| 4,124,273 | 11/1978 | Huignard | 350/388 |
| 4,151,401 | 4/1979 | Van Bokestal et al. | 219/446 |
| 4,262,198 | 4/1981 | Gupta et al. | 350/353 |
| 4,268,871 | 5/1981 | Kawamura | 358/298 |
| 4,466,703 | 8/1984 | Nishimoto | 350/393 |
| 4,490,611 | 12/1984 | Sekimoto et al. | 346/76 PH |
| 4,509,824 | 4/1985 | Yamasaki et al. | 350/413 |
| 4,523,801 | 6/1985 | Baba et al. | 350/6.8 |
| 4,563,056 | 1/1986 | Tagawa et al. | 350/6.8 |
| 4,572,616 | 2/1986 | Kowel et al. | 350/347 V |

FOREIGN PATENT DOCUMENTS

611167  6/1978  U.S.S.R. ............... 350/393

OTHER PUBLICATIONS

Leite et al., "Low Absorption Measurements by Means of the Thermal Lens Effect Using an He-Ne Laser", App. Phys. Letts., 10-1964, pp. 141-143.

Rieckhoff, K. E., Self-Induced Divergence of CW Laser Beams in Liquids—A New Nonlinear Effect in the Propagation of Light, App. Phys. Letts. 7-1966, pp. 87-88.

Koyama, M. H., "Thermo-Optic Effect in $LiNbO_3$ for Light Deflection & Switching", Electronics Letts., 10-29-81, pp. 842-844.

Sliusarey, G. G., "The Influence of Temperature Gradient of Glass of Optical Systems on the Image Produced by the Latter", Optika I Spektroposkopia (Optics and Spectroscopy) 2-1959, pp. 134-138.

Primary Examiner—Bruce Y. Arnold
Assistant Examiner—Martin Lerner
Attorney, Agent, or Firm—Fitzpatrick, Cella, Harper & Scinto

[57] ABSTRACT

An optical element whose focal length is variable comprises a medium whose refractive index is variable by temperature, a heating device for imparting heat to the medium to cause an index gradient resulting from a temperature distribution to be created in the medium, and a device for controlling the amount of heat imparted to the medium by the heating device to vary the shape of the index gradient formed in the medium.

9 Claims, 14 Drawing Sheets

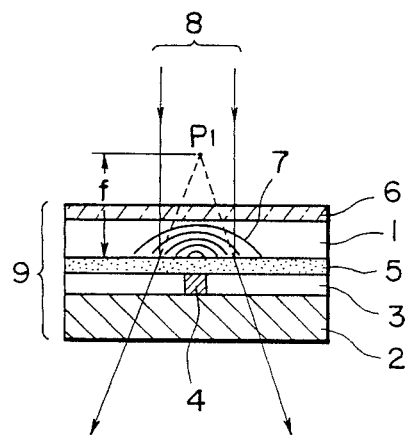
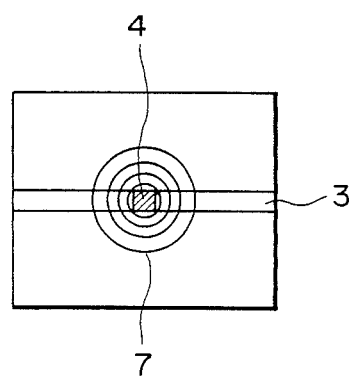
FIG. 1A    FIG. 1B
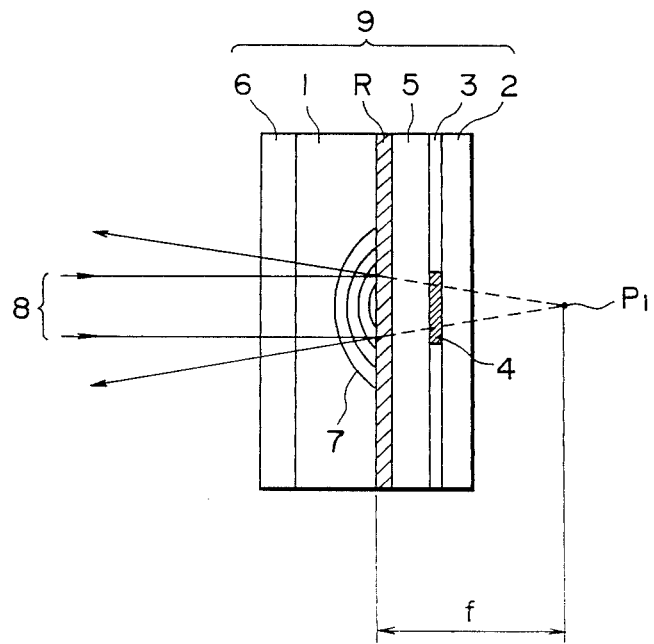
FIG. 1C

FIG. ID

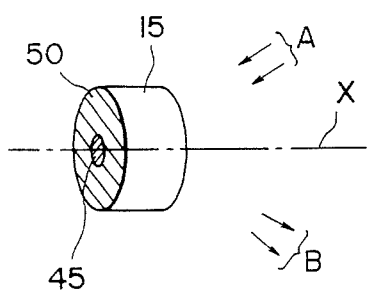
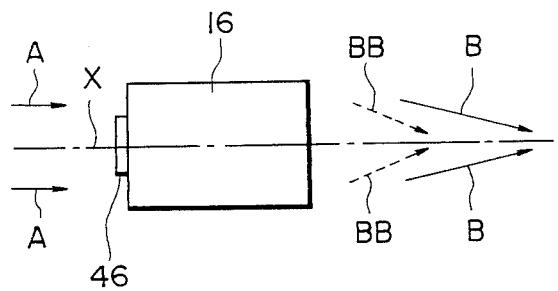
FIG. 7  FIG. 8
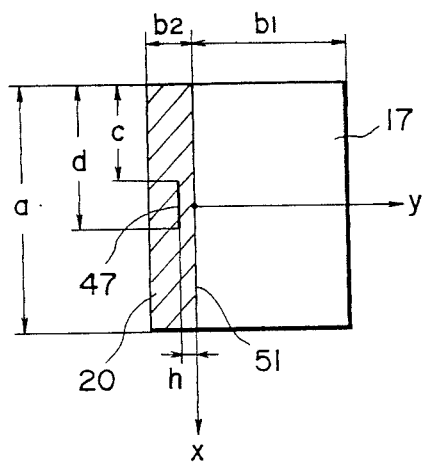
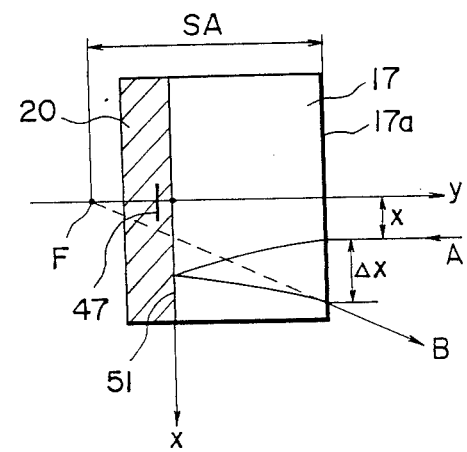
FIG. 9A  FIG. 9B
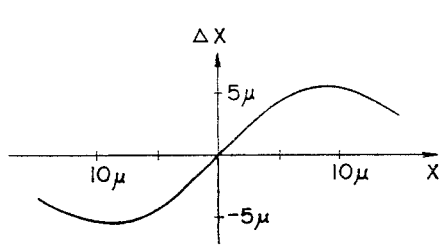
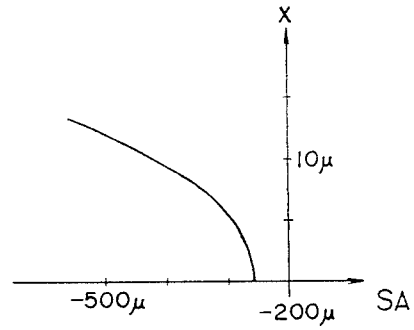
FIG. 9C  FIG. 9D

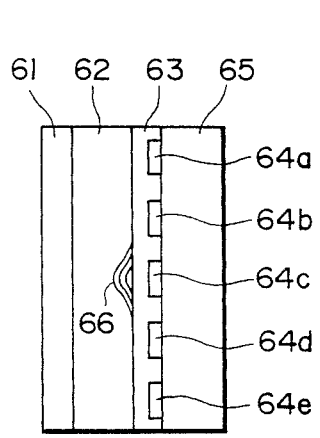
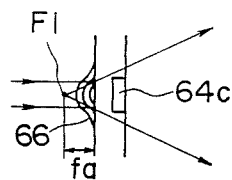
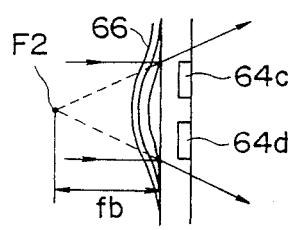
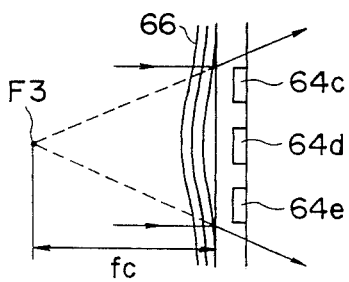
FIG. 10      FIG. 11A
FIG. 11B
FIG. 11C
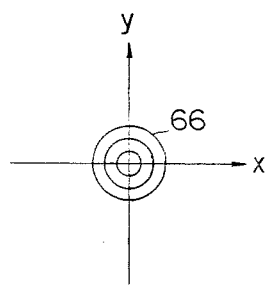 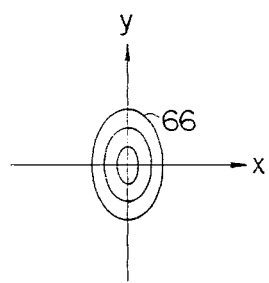 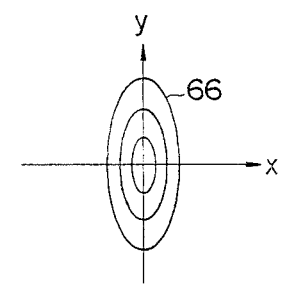
FIG. 12A      FIG. 12B      FIG. 12C

VARIFOCAL OPTICAL ELEMENT

This application is a division of application Ser. No. 943,837, filed Dec. 18, 1986, now abandoned, which was a continuation of now abandoned application Ser. No. 600,959, filed Apr. 16, 1984, now abandoned.

BACKGROUND OF THE INVENTION

1. Field of the Invention

This invention relates to an optical element whose focal length is variable.

2. Description of the Prior Art

Lenses, mirrors, gradient index type light H) transmitters, etc. are well-known as optical elements for imparting a converging action or a diverging action to an incident light beam. To make the focal lengths of these optical elements variable, one of the radius of curvature, the refractive index and the thickness of the lens, the mirror or the like must be varied. However, in the lens, the mirror or the like, once the shape and material thereof are determined, the refractive index thereof is primarily determined and the radius of curvature and thickness thereof cannot be varied unless the lens, the mirror or the like is re-worked.

In recent years, elements using an electro-optic material or liquid crystal have been proposed as elements capable of effecting convergence and divergence of light, but these elements depend on the polarization of light and accordingly, the usages thereof are limited.

SUMMARY OF THE INVENTION

It is an object of the present invention to provide an optical element entirely different from the conventional optical elements and capable of effecting convergence and divergence of light.

It is a further object of the present invention to provide a varifocal optical element whose focal length can be readily varied.

It is still a further object of the present invention to provide a varifocal optical element whose focal length can be greatly varied.

It is yet still a further object of the present invention to provide a varifocal optical element which is not affected by the temperature characteristic of the refractive index of a thermal effect medium.

Other objects of the present invention will become apparent from the following detailed description taken in conjunction with the accompanying drawings.

In a varifocal optical element according to the present invention, heat is imparted to a medium whose refractive index is variable by temperature (hereinafter referred to as the thermal effect medium) to cause an index gradient resulting from a temperature distribution to occur in the medium and the amount of heat imparted to the medium is controlled, thereby varying the focal length of a light beam entering said medium.

In the varifocal optical element according to the present invention, means for controlling the amount of heat imparted to the medium include means for controlling the magnitude of an electrical signal imparted to heat generating means or for illuminating the heat generating means and controlling the amount of the light beam converted into heat by the heat generating means, means for varying the heating area which heats the thermal effect medium, and means for varying the heated portion of the thermal effect medium.

The thermal effect medium used in the varifocal optical element according to the present invention may desirably be a medium whose refractive index is greatly varies with a temperature change. As the medium whose refractive index is greatly varied, there are more liquid mediums than solid mediums. Further, the mediums include mediums whose refractive indices increase with temperature rise (hereinafter referred to as the mediums having a positive temperature coefficient of refractive index) and mediums whose refractive indices decrease with temperature rise (hereinafter referred to as the mediums having a negative temperature coefficient of refractive index). The mediums having a negative temperature coefficient of refractive index which are usable in the optical element of the present invention include liquids such as ethyl alcohol, benzene, ethyl ether, methylene iodide, water, carbon tetrachloride, etc. and solids such as polystyrene, polycyclohexyl methacrylate, polymethyl methacrylate, fluorite ($CaF_2$), halite, crystal, quartz glass, FK5 (trade name: a product of Obara Kogaku Co., Ltd.), etc., and the mediums having a positive temperature coefficient of refractive index include lithium niobate ($LiNbO_3$), calcite, BK7, SF6 (both trade names: products of Obara Kogaku Co., Ltd.), etc.

Further, as the varifocal optical element according to the present invention, there is disclosed the construction of an element in which, although the power obtained by the medium has been primarily determined to the positive or the negative due to the fact that the shape of the index gradient formed in the medium is primarily determined by the temperature coefficient of refractive index of the medium, a desired power is obtained irrespective of the temperature coefficient of the medium. Therefore, in an embodiment of the optical element of the present invention, index gradients resulting from a temperature change are formed at least two spaced apart locations in the thermal effect medium at a time and the index gradients are formed as if at least a part of the light beam acted on by each index gradient passed through the same point or diverged from the same point when the index gradients are formed. That is, a plurality of index gradients cooperate to form an imaging or diverging optical element.

BRIEF DESCRIPTION OF THE DRAWINGS

FIGS. 1A, 1B, 1C, 1D, 2A, 2B, 2C and 3 show various embodiments of the varifocal optical element according to the present invention.

FIGS. 5A, 5B, 6, 7 and 8 show further embodiments of the varifocal optical element according to the present invention.

FIGS. 9A and 9B show cross-sections of an embodiment of the varifocal optical element according to the present invention used for calculation and experiment, and FIGS. 9C and 9D show the experimental results.

FIGS. 10, 11A, 11B, 11C, 12A, 12B and 12C illustrate further embodiments of the varifocal optical element according to the present invention.

DETAILED DESCRIPTION OF THE PREFERRED EMBODIMENTS

Figure 2A:
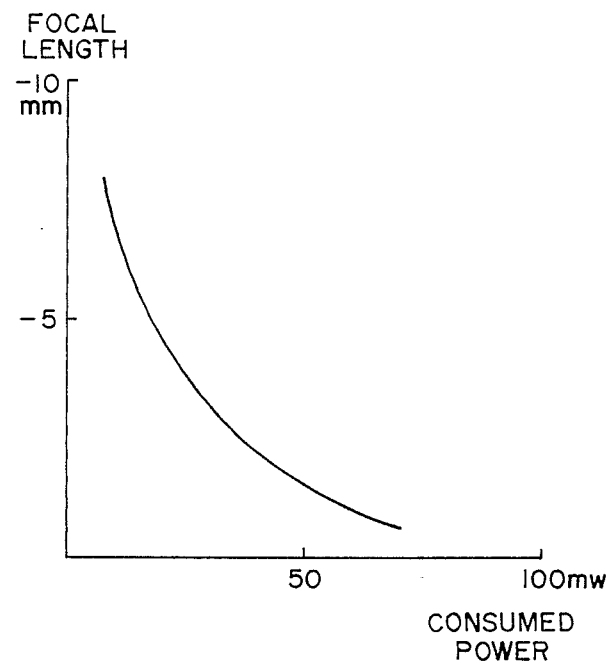
Figure 2A:
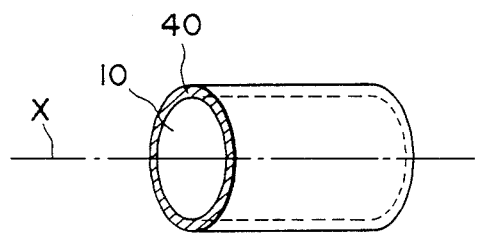

FIG. 1 shows an embodiment of the varifocal optical element according to the present invention, FIG. 1A being a side view of the element and FIG. 1B being a plan view of the element. The varifocal optical element 9 comprises, in succession from bottom to top, a substrate 2 having insulativeness, an electrode 3 provided on the substrate 2, a heat-generating resistance member 4 such as $HfB_2$ formed in a portion of the electrode 3, a protective film 5 formed of an insulative material such as $SiO_2$, a thermal effect medium 1 having temperature dependence of refractive index, and a transparent protective layer 6 such as glass. The medium 1 is a liquid or a solid, but generally a liquid is greater in the variation of refractive index due to temperature and can increase the focus variation range.

Operation of the above-described embodiment will now be described. When a current flows to the electrode 3, the heat-generating resistance member 4 generates heat and the medium near the heat-generating resistance member 4 is heated. Accordingly, an index gradient 7 is created in the medium 1 as shown in FIG. 1 and the refractive index becomes non-uniform and thus, the medium has the function of a lens.

Accordingly, a light beam 8 having entered the optical element 9 from a direction substantially perpendicular to the surface of the heat-generating resistance member 4 is caused to locally diverge or converge by the action of said lens and the degree thereof is proportional to the amount of variation in refractive index, namely, the current flowing through the heat-generating resistance member 4. The optical element 9 can also be used as a lens if the whole thereof is made into an optically transparent member, or can also be used as a reflecting mirror if the protective film 5 is made into a reflecting surface. According to this optical element, there can be realized a varifocal optical element which is excellent in responsiveness and which does not require any portion movable in mechanism, and such element can be effectively applied to an auto-focus mechanism, for example.

In the varifocal optical element 9 shown in FIG. 1, whether the index gradient 7 acts as a convex lens having a positive power or as a concave lens having a negative power is determined by whether the refractive index of the medium 1 becomes higher or lower when heat is imparted to the medium 1. Such characteristic of the medium is represented by the temperature coefficient $dn/dT$ of refractive index of the medium, and the medium whose refractive index becomes higher when the temperature of the medium is increased is a medium having a positive temperature coefficient of refractive index, and the medium whose refractive index becomes lower when the temperature of the medium is increased is a medium having a negative temperature coefficient of refractive index. When the medium having a positive temperature coefficient of refractive index is heated, a valley type (concave type) equal index gradient curve (herein simply referred to as the index gradient) is formed about the heated position and a light beam entering this position is converged. That is, the index gradient formed in the medium by heating the medium having a positive temperature coefficient of refractive index acts as a convex lens. In contrast, when the medium having a negative temperature coefficient of refractive index is heated, a mountain type (convex type) index gradient is formed about the heated position as indicated by the index gradient 7 in FIG. 1A, and a light beam entering this position emerges from the element 9 as if it diverged from a certain point $P_1$. That is, the index gradient formed in the medium by heating the medium having a negative temperature coefficient of refractive index acts as a concave lens. In FIG. 1A, the incident light beam 8 is a light beam which diverges with the point $P_1$ as the origin, and the distance from this point $P_1$ to the boundary surface between the thermal effect medium 1 and the protective layer is f and this is defined as the focal length.

FIG. 1C shows an embodiment in which a light-reflecting layer R formed of a metal such as Al is provided between the protective film 5 and the thermal effect medium 1 of the element 9 shown in FIG. 1A and the element 9 is formed into a refractive type. When a parallel light beam 8 enters this element 9, the wavefront is converted by the index gradient 7 and reflected by the light-reflecting layer R, whereafter the wavefront is further converted by the index gradient 7 and the light beam emerges from the element 9 as if it diverged from the diverging origin $P_1$. When the size of the heat-generating resistance member 4 was 50 $\mu m \times 50$ $\mu m$ and the resistance value thereof was 67$\Omega$ and a DC voltage of about 2.5 V was applied thereto, there was observed a concave lens in which $f \approx -0.6$ mm and N.A. $\approx 0.16$. When the voltage was dropped from 2.5 V and the power consumed by the heat-generating resistance member was decreased, it was observed that the focal length thereof became longer as shown in FIG. 1D. The value of the focal length f in the embodiment shown in FIG. 1C is the distance from the boundary surface between the medium 1 and the light-reflecting layer R to the point $P_1$.

FIG. 2A is a perspective view of the varifocal optical element according to another embodiment of the present invention. This element comprises a cylindrical thermal effect medium 10 having temperature dependence of refractive index, and a heat-generating member 40 formed on the lengthwise side surface of the medium 10. X designates the optic axis. In this element, when the heat-generating member 40 is not generating heat, a parallel light beam incident from the left-hand side of the optic axis X is affected in no way by the element and accordingly, the focus position of the incident light beam is at infinity.

Figure 2B:
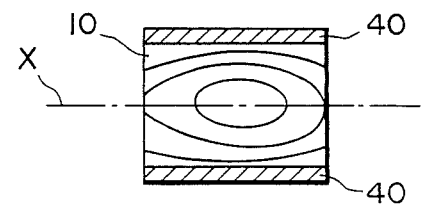
Figure 2C:
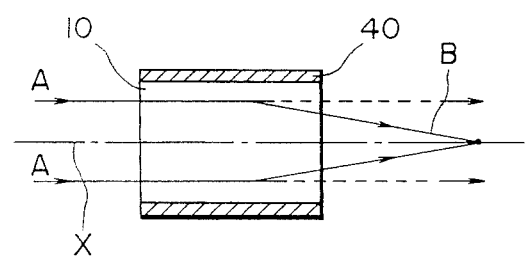

In the varifocal optical element of FIG. 2A, when the heat-generating member 40 is caused to generate heat, the medium 10 is heated and a temperature distribution is formed as illustrated in FIG. 2B. This temperature distribution is depicted with the medium 10 as a medium having a negative temperature coefficient of refractive index, and the temperature in the vicinity of the optic axis is low and the temperature in the vicinity of the heat-generating member 40 is high. Accordingly, a non-uniform index gradient is formed in the medium 10 in accordance with the temperature coefficient dn/dT of refractive index of the medium 10. This index gradient has a so-called "radial gradient" and therefore, the medium 10 has a strong refractive power for the rays incident in the direction of the optic axis X.

That is, the reason why the varifocal optical element shown in FIG. 2 has the function of a lens when the heat-generating member 40 is generating heat is that a smooth temperature distribution is formed symmetrically in the radial direction of the optic axis when the heat-generating member is generating heat. This is because, if such a temperature distribution is formed, the index gradient in the medium 10 becomes smooth in the radial direction of the optic axis and, if the optic axis X is the x-axis and the distance from the optic axis X is r, the refractive index $n(x, r)$ in $(x, r)$ is $n(x, r) = n_o(x) + n_1(x)r^2 + \ldots$ when it is Taylor-developed. It is well known that a medium having such an index gradient has an imaging function. Since $n_o(x)$ and $n_1(x)$ are varied by a variation in the amount of heat generated by the heat-generating member, the focus can be made variable. What is important here is that $n_1(x)$ is varied and when only $n_o(x)$ is varied, the variation in refractive power is much greater than, for example, when the refractive index of the ordinary glass lens is uniformly varied. In the case of the construction of the element and the manner of incidence of the incident light beam shown in FIG. 2, where the temperature coefficient dn/dT of refractive index of the medium 10 is negative, the medium 10 has approximately the function of a convex lens for the incident light beam A during heat generation of the heat-generating member 40 and the position of the focus B of the emergent light beam is displaced as shown in FIG. 2C and the amount of displacement thereof can be made into a desired value by controlling the amount of heat generated by the heat-generating member 40. In contrast, where the medium 10 has a positive temperature coefficient of refractive index, the incident light beam becomes a divergent light beam.

Figure 3:
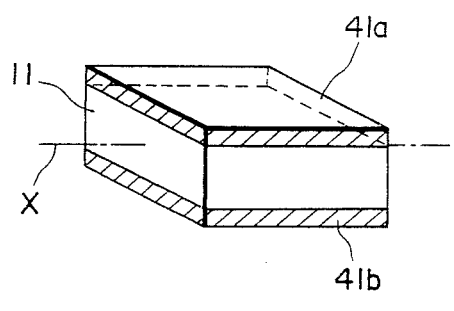

FIG. 3 is a perspective view of another embodiment of the optical element according to the present invention. This varifocal optical element comprises a rectangular parallelopiped medium 11 having temperature dependence of refractive index, and heat-generating members 41a and 41b formed on the opposed upper and lower surfaces, respectively, of the medium 11. When the heat-generating members 41a and 41b are caused to generate heat at a time and equally, the temperature distribution in the medium 11 becomes lower from the surfaces near the heat-generating members 41a and 41b to the surface defined by the optic axis X (the surface parallel to the heat-generating members 41a and 41b), and this element can be used as a varifocal optical element having the function of a cylindrical lens. The influence imparted to the incident light beam by the temperature coefficient of refractive index of the medium is the same as that described in connection with FIG. 2 and therefore need not be described.

Figure 4:
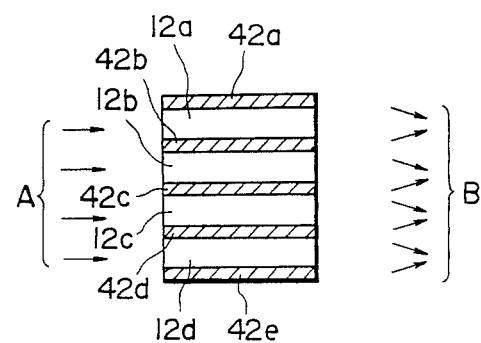
FIG. 4 shows an embodiment in which the varifocal optical element according to the present invention is made into an array-like form.

FIG. 4 is a cross-sectional view of another embodiment of the varifocal optical element obtained by modifying the embodiment of FIG. 3. This varifocal optical element comprises a plurality of rectangular parallelopiped thermal effect mediums 12a, 12b, 12c and 12d formed through heat-generating members 42a, 42b, 42c, 42d and 42e, and assumes the construction of a compound-eye optical system in which the embodiment of FIG. 3 is superposed in a direction orthogonal to the optic axis. In this case, a varifocal optical element of great aperture can be obtained as compared with the embodiment of FIG. 3.

Figure 5A:
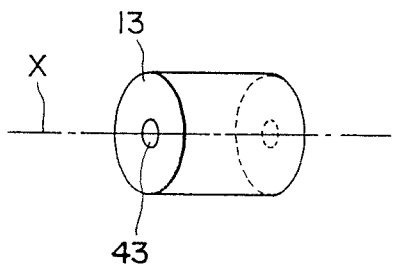
Figure 5B:
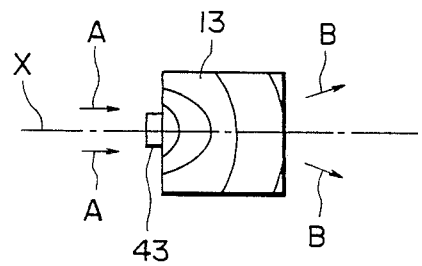

FIG. 5A shows an embodiment of the varifocal optical element in which on the surface on the light entrance side (the left side as viewed in the Figure) of a cylindrical thermal effect medium 13 having temperature dependence of refractive index, there is provided a transparent heat-generating member 43 smaller than said surface. The temperature distribution in the medium 13 having a negative temperature coefficient of refractive index when the heat-generating member 43 generates heat spreads from the vicinity of the heat-generating member 43 toward the portion around it, as shown in FIG. 5B. That is, conversely to the embodiment shown in FIG. 2B, the temperature becomes lower in the direction away from the optic axis X. Again in this case, the formed temperature distribution has an intense radial gradient and, where the temperature coefficient dn/dT of refractive index of the medium 13 is negative, this element has the function of a concave lens and, where the temperature coefficient dn/dT is positive, this element has the function of a convex lens.

Figure 6:
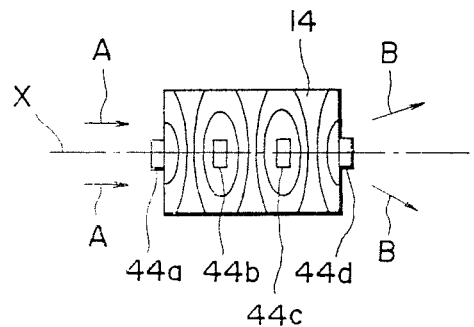

FIG. 6 is a cross-sectional view of an embodiment of the varifocal optical element obtained by modifying the embodiment of FIG. 5A. This varifocal optical element comprises a cylindrical thermal effect medium 14 and a plurality of transparent heat generating members 44a, 44b, 44c and 44d provided along the optic axis within the medium 14, and assumes a construction in which a plurality of the embodiments of FIG. 5A are superposed one upon another. In this case, a greater amount of variation in the focus position than in the embodiment of FIG. 5A is obtained by causing the plurality of heat-generating members 44a–44d to generate heat.

FIG. 7 shows an embodiment of the varifocal optical element obtained by modifying the embodiment of FIG. 5. In this element, a reflecting surface 50 is formed on that side of a cylindrical medium 15 on which a heat-generating member 45 is provided, that is, this element is an in-mirrored form of the FIG. 5 embodiment. A light beam A entering the element on the other side of the medium 15 which is not formed with the heat-generating member 45, from obliquely above the optic axis X, passes through the medium 15 and is reflected by the reflecting surface 50, and further passes through the medium 15 and emerges obliquely downwardly of the optic axis X as indicated at B. In this case, when the heat-generating member 45 generates heat, the light beam passes twice through the medium 15 in which an index gradient has been formed and therefore, a greater amount of variation in the focus position than in the embodiment of FIG. 5 is obtained. The result of the experiment associated with this embodiment will be described later.

In a further embodiment of the varifocal optical element according to the present invention shown in FIG. 8, a thermal effect medium 16 is an index gradient type lens having a non-uniform index gradient and is cylindrically shaped. The focus position of this medium 16 is finite as indicated by the emergent light beam B, and by causing a transparent heat-generating member 46 provided on the entrance side of the medium 16 to generate heat, the focus position can be varied as indicated, for example, by the emergent light beam BB, and this is convenient to various applications.

In the embodiments shown in FIGS. 1 to 7, if one or both of the entrance side surface and the exit side surface of the medium 1, 10, 11, 12, 13, 14, 5 are made into curved surfaces, there will of course be obtained an effect similar to that of the embodiment shown in FIG. 8.

Also, in the above-described embodiments, if the heat generation of the heat-generating member 4, 40, 41, 42, 43, 44, 45, 46 is continued for a certain degree of time, the temperature distribution in the medium 9, 10, 11, 12, 13, 14, 15, 16 will become balanced and the formed temperature distribution will nearly disappear and the focus position will restore the original position before the heat generation, but if the heat generation and the non-heat generation are changed over at a high speed, the temperature distribution can be maintained.

To describe in detail the relation to the present invention, particularly the embodiment of FIG. 7, the results of the calculation and experiment will now be described by reference to FIGS. 9A–9D.

FIG. 9A is a cross-sectional view of the varifocal optical element used in the calculation and experiment, the medium 17 is ethanol, reference numeral 47 designates a resistance film which is a heat-generating member, reference numeral 20 denotes the base of an $SiO_2$ layer for protecting the resistance film, and the interface between the $SiO_2$ layer 20 and the ethanol layer 17 provides a reflecting surface 51. This calculation was carried out with a two-dimensional model in which the direction perpendicular to the plane of the drawing sheet of FIG. 9A was infinite and further by the use of the following parameters:

q: unit area of resistance film 47·amount of generated heat per unit time=$4.5 \times 10^{10}$ erg/cm$^2$·sec
a: width of base 20=0.15 cm
$b_1$: thickness of ethanol layer 17=0.02 cm
$b_2$: thickness of $SiO_2$ layer=$7 \times 10^{-4}$ cm
h: distance between resistance film 47 and reflecting surface 51 =$2 \times 10^{-4}$ cm
$R_1$: heat conductivity of ethanol=$166 \times 10^4$ erg/cm·sec·° K
$R_2$: heat conductivity of $SiO_2$=$190 \times 10^5$ erg/cm·sec·° K
c, d: distances of the ends of resistance film 47 from the base end
c=$7.45 \times 10^{-2}$ cm
d=$7.55 \times 10^{-2}$ cm With the foregoing parameters as the conditions and under the boundary condition in which the surface temperature of the varifocal optical element of FIG. 9A was maintained at 0° C., the two-dimensional heat conduction equation was solved and the steady temperature distribution of the ethanol layer was found. By multiplying this temperature distribution by the temperature coefficient dn/dT= $-0.0004$ of refractive index of ethanol, the index gradient in ethanol was found and ray tracing could be accomplished.

If, as shown in FIG. 9B, the y-axis is the optic axis and a light ray A parallel to the optic axis at a height x is caused to enter the element and this ray passes through the ethanol layer 17 and is reflected by the reflecting surface 51 and the height when the ray has passed through and emerged from the ethanol layer 17 is x+$\Delta$x, $\Delta$x corresponds to the transverse aberration when the surface 17a of the ethanol layer 17 is the evaluation surface, and the distance SA between the focus position F and the surface 17a corresponds to spherical aberration. FIGS. 9C and 9D show the calculated values of $\Delta$x and SA. As is apparent from these Figures, when x= $-5\mu$ through $5\mu$, the emergent ray B looks as if it exited from a point and thus, it is recognized that this element has the function of a concave lens. The then focus position F can be controlled by varying the amount of generated heat of the resistance film 47 as a matter of course.

The embodiments shown in FIGS. 1 to 8 have shown a case where the amount of heat generated by the heat-generating member is varied to vary the focal length, but there is other effective means as the means for varying the focal length. That means is by varying the size of the area which imparts heat to the medium or varying the portion which imparts heat, and this will hereinafter be described by reference to FIGS. 10 to 16.

FIGS. 10, 11A, 11B, 11C, 12A, 12B and 12C illustrate another embodiment of the varifocal optical element of the present invention. In FIG. 10, reference numeral 61 designates a transparent protective plate, reference numeral 62 denotes a thermal effect medium having a negative temperature coefficient of refractive index and whose refractive index is variable by heat, reference numeral 63 designates an insulating layer, reference characters 64a, 64b, ... disposed in a plane substantially parallel with a light beam incident plane of medium 62 in plate 61 denote heat-generating resistance members, and numeral 65 designates an insulative transparent substrate. When a voltage is applied to any one of the heat-generating resistance members, e.g. 64c, to cause it to generate heat, an index gradient 66 is formed in the thermal effect medium 62.

FIGS. 11A–11C show the manner in which the curve of the equal or single, continuous index gradient is formed in the element shown in FIG. 10 when a voltage is applied to the adjacent heat-generating resistance members 64c, 64d and 64e in succession.

FIG. 11A refers to a case where a voltage has been applied only to a heat-generating resistance member 64c. In this case, the index gradient in the thermal effect medium 62 is such that a sharp variation in refractive index occurs in the vicinity of the heat-generating resistance member, and the light beam having entered that portion diverges as if the wavefront was converted by a lens having a focus F1 near the boundary surface between the thermal effect medium 62 and the insulating layer 63. Next, FIG. 11B refers to a case where a voltage has been applied to adjacent heat-generating resistance members 64c and 64d. In this case, by suitably setting the thickness of the insulating layer 63, the index gradient in the thermal effect medium exhibits a more gentle variation in refractive index in the vicinity of the center thereof than in the case of FIG. 11A. At this time, the focus F2 of the index gradient is formed at a position more distant from the heat-generating resistance members than said focus F1 and accordingly, the focal length is longer than in FIG. 11A. Further, FIG. 11C refers to a case where a voltage has been applied to adjacent heat-generating resistance members 64c-64e and, in this case, the variation in refractive index in the vicinity of the center of the index gradient is gentler than in the case of FIG. 11B. The focus F3 thereof is formed at a position more distant from the heat-generating resistance members. As a result, assuming that the focal lengths in the respective cases of FIGS. 11A-11C are fa, fb and fc, fa<fb<fc. On the other hand, in a cross-section orthogonal to the cross-section shown in FIGS. 11A-11C, the variation in refractive index in the vicinity of the center of the index gradient is not so much varied. This will be well understood if the equal index gradient curves as seen from a H) direction orthogonal to the boundary surface between the thermal effect medium 62 and the insulating layer 63 are observed.

FIGS. 12A-12C show the equal index gradient curves and FIGS. 12A, 12B and 12C correspond to FIGS. 11A, 11B and 11C, respectively. In FIG. 12A, there is provided a substantially rotation-symmetric equal index gradient curve by making the heat-generating resistance members square.

In FIG. 12B, the variation in refractive index in the direction of arrangement of the heat-generating resistance members is smaller and thus, an elliptical gradient curve is provided.

Further, in FIG. 12C, the degree of the variation in refractive index in the direction of arrangement of the heat-generating resistance members is smaller still and therefore, there is provided an ellipse having a longer major axis. However, in any of FIGS. 12B and 12C, the degree of the variation in refractive index in a direction orthogonal to the direction of arrangement of the heat-generating resistance members is not so much varied.

That is, if the number of heat-generating resistance members to which a voltage is applied is increased, only the focal length in the cross-section containing the axis y of the direction of arrangement thereof will become long and the focal length in the cross-section containing the axis x of a direction orthogonal to the direction of arrangement of the heat-generating resistance members can be made substantially invariable.

The above-described result can be realized by setting the arrangement pitch of the heat-generating resistance members and the applied voltage to predetermined values.

Figure 13:
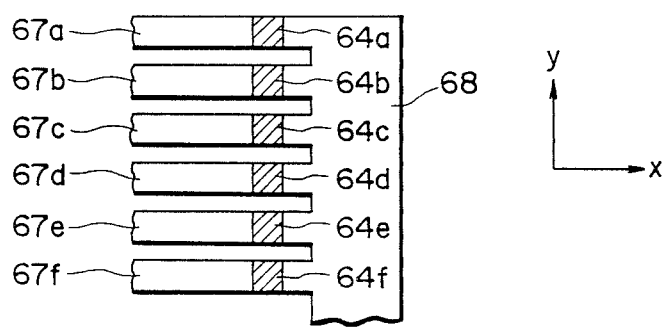
FIGS. 13, 14 and 15 show the patterns of the heat-generating resistance members of the varifocal optical element according to the present invention.

FIG. 13 shows an example of the wiring pattern of the heat-generating resistance members and electrodes in the above-described embodiment. Reference characters 64a, 64b, . . . , 64f designate heat-generating resistance members, reference characters 67a, 67b, . . . , 67f denote independent electrodes, and reference numeral 68 designates a common electrode connected to the heat-generating resistance members. In the example shown in FIG. 13, only a desired one of the heat-generating resistance members can be caused to generate heat by applying a voltage to a selected one of the electrodes 67a, 67b, . . . to which the voltage can be applied independently.

Figure 14:
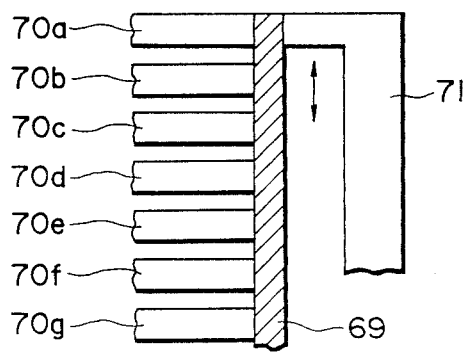

FIG. 14 shows another example of the electrode arrangement and electrode pattern. Reference numeral 69 designates a heat-generating resistance member, reference characters 70a, 70b, . . . , 70g denote independent electrodes, and reference numeral 71 designates an electrode grounded or set to a predetermined potential. When a voltage is applied to any one of the independent electrodes 70a, 70b, . . . , 70g, the resistance value between that electrode and the electrode 71 is varied. By rendering the voltage into a predetermined value in conformity with the selected one of the independent electrodes 70a, 70b, . . . , 70g, the amount of heat generated per unit area of the heat-generating resistance member can be rendered into a desired value. When a voltage is applied, for example, to an independent electrode selected so as to make the amount of heat generated per unit area of the heat-generating resistance member constant, it becomes possible to obtain an equal index gradient curve similar to that shown in FIGS. 12A-12C. The case where, for example, the independent electrode 70a is selected and a predetermined voltage is applied to between that electrode and the electrode 71 corresponds to FIG. 12A, the case where the independent electrode 70b is selected and a predetermined voltage is applied to between that electrode and the electrode 71 corresponds to FIG. 12B, and the case where the independent electrode 70c is selected and a predetermined voltage is applied to between that electrode and the electrode 71 corresponds to FIG. 12C.

Figure 15:
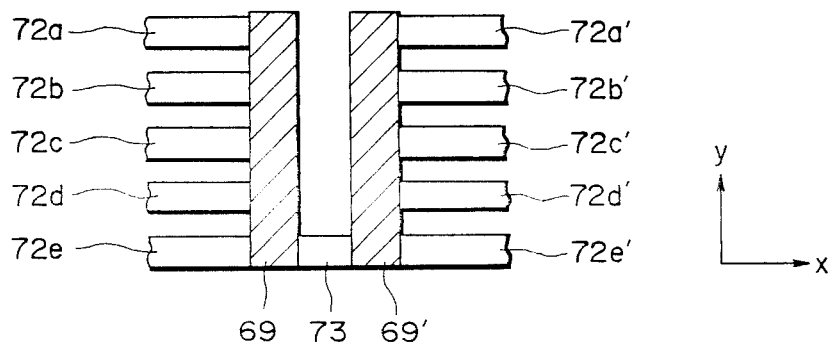

FIG. 15 shows a further example of the above-described pattern of the heat-generating H) resistance members and electrodes. Reference numerals 69 and 69' designate heat-generating resistance members similar to the heat-generating resistance member shown in FIG. 14, these resistance members being connected together by an electrically conductive member 73. Reference characters 72a, 72b, . . . , 72e and 72a', 72b', . . . , 72e' denote independent electrodes. A pair of electrodes such as 72a and 72a', 72b and 72b', . . . may be selected and a voltage may be applied thereto. When, for example, the pair of electrodes 72a and 72a' is selected, the heat-generating resistance members 69 and 69' generate heat on their whole surfaces and accordingly, there is provided a gradient having a small variation in refractive index in the y-direction. Also, when the pair of electrodes 72e and 72e' is selected, it becomes possible to obtain a gradient having a small variation in refractive index in the x-direction.

Accordingly, there can be created an effect similar to that of any anamorphic lens.

Figure 16:
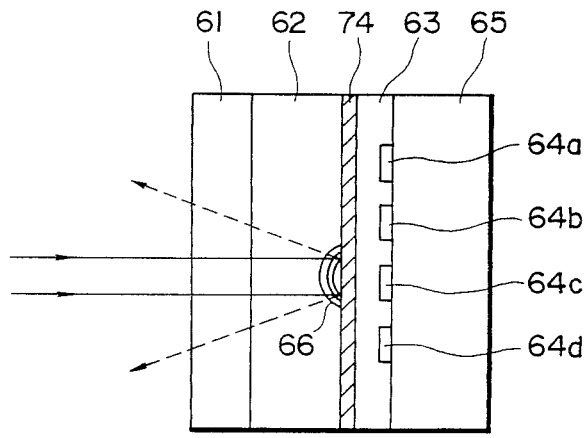
FIGS. 16, 17, 18, 19 and 20 illustrate further embodiments of the varifocal optical element according to the present invention.

FIG. 16 shows an embodiment of the reflective type varifocal optical element in which a light-reflecting layer 74 is provided between a thermal effect medium 62 and an insulating layer 63. Layer 74 excludes those areas in which heating elements 64a-64d lie from being illuminated.

Again in this case, the wiring patterns as shown in FIGS. 13-15 can be used and a similar effect is provided and, as compared with the previous H) embodiment, a short focal length can be realized.

The above-described varifocal optical element has been such that a lens is formed by an index gradient. In such a case, however, as described above whether the power of the lens obtained by the temperature coefficient of refractive index of the thermal effect medium is primarily determined. So, the construction of an optical element which is capable of providing a positive lens or a negative lens without being affected by the temperature coefficient of refractive index of the medium will now be described by reference to FIGS. 17 to 20. This construction is such that index gradients are formed at at least two locations in the thermal effect medium at a time and at least a part of each light beam acted on by each index gradient is set as if it converged at a point or diverged from a point.

Figure 17:
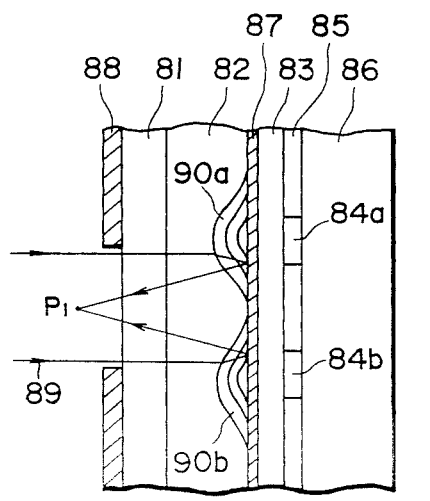
Figure 18:
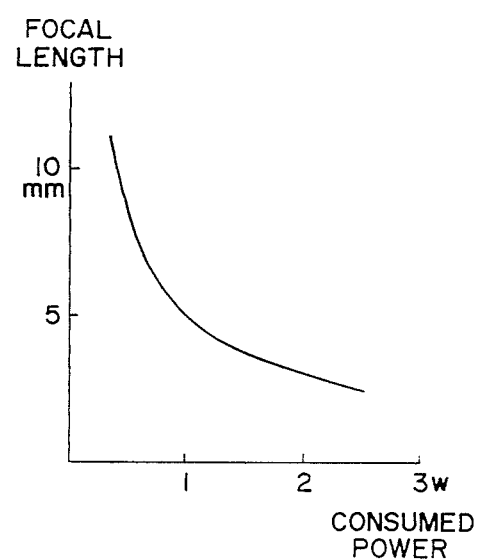

FIG. 17 shows an embodiment of the varifocal optical element according to the present invention, and the element shown in this Figure is basically similar in construction to the element shown in FIG. 1C. In FIG. 17, reference numeral 81 designates a transparent protective plate such as glass, reference numeral 82 denotes a thermal effect medium such as ethyl alcohol, reference numeral 83 designates an insulating layer such as $SiO_2$, reference characters 84a and 84b denote heat-generating resistance members such as $HfB_2$, reference numeral 85 designates an electrode, and reference numeral 86 denotes an insulative substrate. Reference numeral 87 designates a light-reflecting layer such as Al formed on the insulating layer of $SiO_2$. The heat-generating resistance members 84a and 84b are disposed at a predetermined interval at positions symmetrical with the light beam entering the surfaces of the resistance members perpendicularly thereto. A slit plate 88 having an opening for limiting the incidence range of the light beam entering the element is provided on the surface of the protective plate 81. In this element, the heat-generating resistance members 84a and 84b are caused to generate heat at a time to thereby create equal index gradients 90a and 90b in the medium 82. At this time, by suitably controlling the spacing between the heat-generating resistance members 84a and 84b, the amounts of heat generated thereby and the size of the opening, there can be created in a part of the medium a state in which, as shown, the variation in refractive index is greater in the marginal portion of the passing light beam, that is, the refractive index is lower in the marginal portion. In such a state, the index gradient has the function of a convex lens for the incident light beam and therefore, as shown, the light beam having entered the element in a parallel state reciprocates in the medium 82, whereafter it converges at a point $P_1$. That is, the slit plate 88 is disposed so that the incident light beam 89 enters only the lower half of the index gradient 90a and the upper half of the index gradient 90b, and a light beam subjected to refracting action in the lower half of the index gradient 90a and a light beam subjected to refracting action in the upper half of the index gradient 90b converge at a point. According, a lens is formed by the two index gradients 90a and 90b.

Where both of the heat-generating resistance members 84a and 84b were made into a stripe shape having a width of 40 μm, a length of 400 μm and a resistance value of about 127Ω and the spacing between the heat-generating resistance members was set to 180 μm and a voltage of about 12 V was applied to the resistance members, there was confirmed the effect of a cylindrical convex lens in which $f \approx 2.5$ mm and $NA \approx 0.036$. Further, when the voltage was reduced from 12 V, it was observed that, as shown in FIG. 18, the focal length became longer with the reduction in the consumed power of the heater. The thermal effect medium used in the above-described example is ethyl alcohol.

Figures 19, 20:
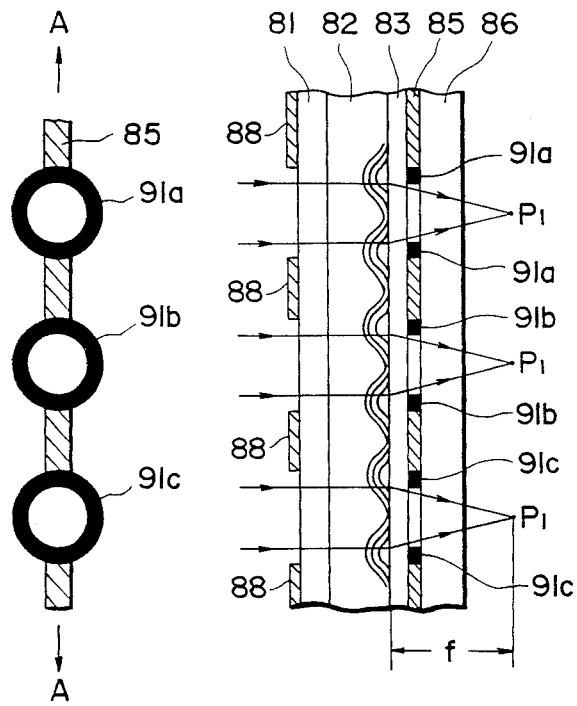

FIGS. 19 and 20 illustrate another embodiment of the varifocal optical element according to the present invention, FIG. 19 being a plan view of the element and FIG. 20 being a cross-sectional view taken along line A—A of FIG. 19. The construction of the element shown in FIGS. 19 and 20 is basically similar to the construction of the element shown in FIG. 17, but the element shown in FIGS. 19 and 20 is of the light-transmitting type. In the element shown in FIGS. 19 and 20, an electrode 85 and heat-generating resistance members 91a, 91b, . . . are formed of materials opaque to the incident light beam and serve also as an opening for limiting the incidence range of the light beam. The heat-generating resistance members 91a, 91b, . . . are ring-shaped and the interior thereof transmits the incident light beam therethrough. Also, the heat-generating resistance members 91a, 91b . . . are arranged in series by the electrode 85 and generate heat at a time upon supply of power thereto. With such a construction, this optical element can cause a convex lens action to be created or disappear in the heat-generating resistance members depending on the presence of the supply of power and can be endowed with the function as a minute lens array. Also, the focal length of the element can be varied as desired by controlling the amount of heat generated by the heat-generating resistance members.

Description will hereinafter be made of an optical apparatus to which the varifocal optical element according to the present invention is applied.

Figure 21:
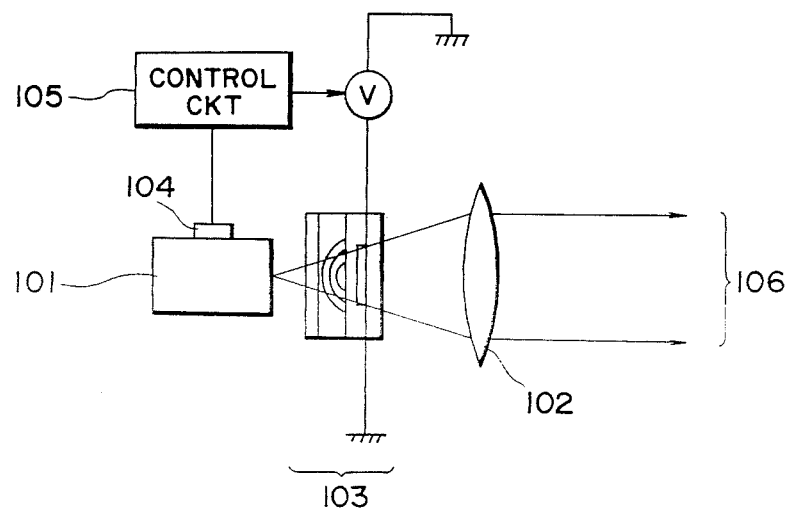
FIG. 21 shows an embodiment in which the optical element of the present invention is used in a light source unit.

FIG. 21 shows a case where the varifocal optical element is applied to the temperature compensating optical device of a semiconductor laser. The light beam emitted from a semiconductor laser 101 has a great divergent angle and therefore, where it is used in a laser beam printer or the like, the semiconductor laser 101 is often combined with a collimator lens 102 to convert said light beam into a parallel light beam.

In this case, under the influence of the thermal expansion due to the heat generation resulting from the oscillation of the laser or to any temperature change of the environment, the focus position of the collimator lens may be disturbed and the degree of parallelism of the emergent light beam may change to adversely affect the printed image. The amount of fluctuation of this focus position is usually of the order of 1 μm and mechanical compensation thereof is very difficult and heretofore, any fluctuation of the focus position has been prevented by using a Peltier element or the like to control the temperature to a constant value. If, as shown in FIG. 21, the varifocal optical element 103 is inserted into the light beam emitted from the laser and a voltage V applied to the varifocal optical element 103 is controlled through a control circuit 105 in accordance with the temperature detected by a temperature sensor 104 installed near the semiconductor laser 101 and the focal length of the varifocal optical element 103 is varied, it will become possible to keep the degree of parallelism of the emergent light beam 106 constant irrespective of the fluctuation of the ambient temperature. This method also has an advantage that the consumed power required for adjustment of the focal length may be small because the amount of displacement of the focus is minute.

Figure 22:
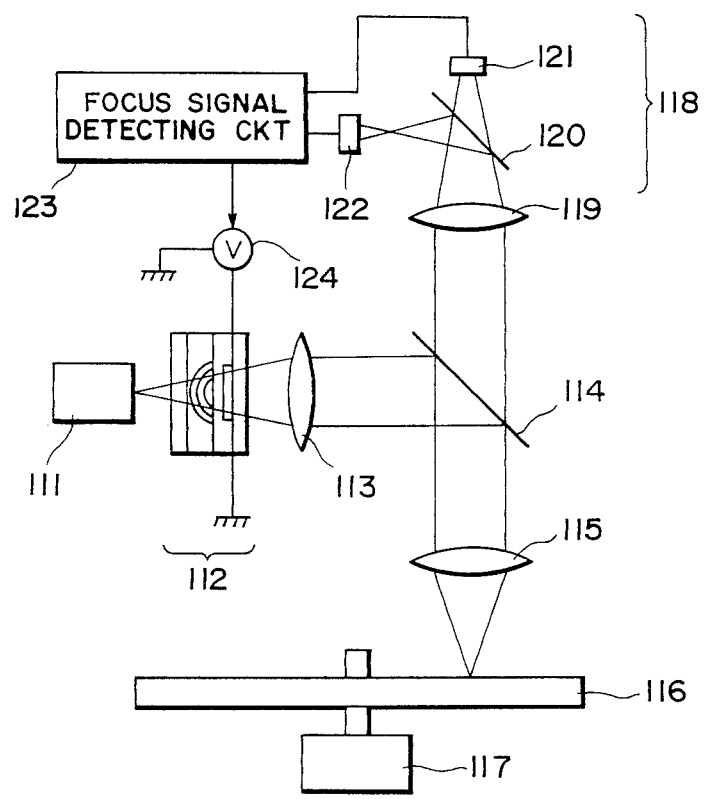
FIG. 22 shows an embodiment in which the optical element of the present invention is used in an optical disk device.

FIG. 22 shows another embodiment to which the varifocal optical element according to the present invention is applied, namely, a varifocal optical apparatus used for the writing or reading-out of an optical memory disk. Reference numeral 111 designates a semiconductor laser, reference numeral 112 denotes a varifocal optical element as described above, reference numeral 113 designates a collimator lens, reference numeral 114 denotes a half-mirror, reference numeral 115 designates a condenser lens, reference numeral 116 denotes a memory disk rotated by a motor 117, and reference numeral 118 designates a focus detection control system comprising, for example, a condenser lens 119, a half-mirror 120, light-quantity detectors 121 and 122 installed before and after the focus position of the condenser lens, and an in-focus signal detecting circuit 123. When the positional relation between the memory disk 116 and the condenser lens 115 varies due to some cause, a signal for controlling the value of the applied voltage or the applied voltage pulse time is input to voltage applying means 124 by the focus detection control system 118.

In response thereto, the index gradient in the thermal effect medium in the varifocal optical element 112 is controlled as previously described, the wavefront of the light beam emitted from the semiconductor laser 111 is converted and the focus is controlled always on the predetermined surface of the memory disk 116 through the lens 115. According to the apparatus of the present invention, as described above, auto-focus can be simply carried out without requiring any mechanical moving mechanism. Also, similarly to the embodiment of FIG. 21, the present embodiment has an advantage that consumed power is small.

Figure 23:
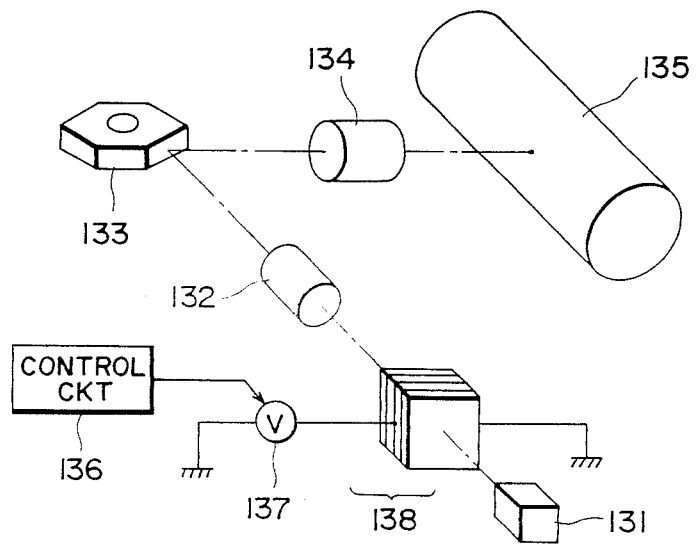
FIG. 23 shows an embodiment in which the optical element of the present invention is used in a scanning device.

FIG. 23 is a schematic view showing another embodiment to which the varifocal optical element according to the present invention is applied, and more specifically an electrophotographic printer optical apparatus. Reference numeral 131 designates a semiconductor laser, reference numeral 132 denotes a condenser lens, reference numeral 133 designates a rotatable polygonal mirror, reference numeral 134 denotes a scanning lens, and reference numeral 135 H) designates an electrophotographic photosensitive medium. In accordance with a signal voltage applied through a control circuit 136 and voltage applying means 137, the wavefront of a light beam emitted from the semiconductor laser 131 is converted by a varifocal optical element 138, whereby the diameter of the imaged spot on the photosensitive medium can be varied and as a result, half-tone recording can be realized as the recording of density change. Alternatively, the distance between the scanning lens 134 and the photosensitive medium 135 may be varied and in accordance therewith, a necessary signal voltage may be applied through the control circuit 136 and voltage applying means 137 to vary the index·gradient in the medium 138, whereby a focus change corresponding to the variation in said distance can be realized and as a result, conversion of the print size, i.e., variable magnification recording, becomes possible.

Figure 24:
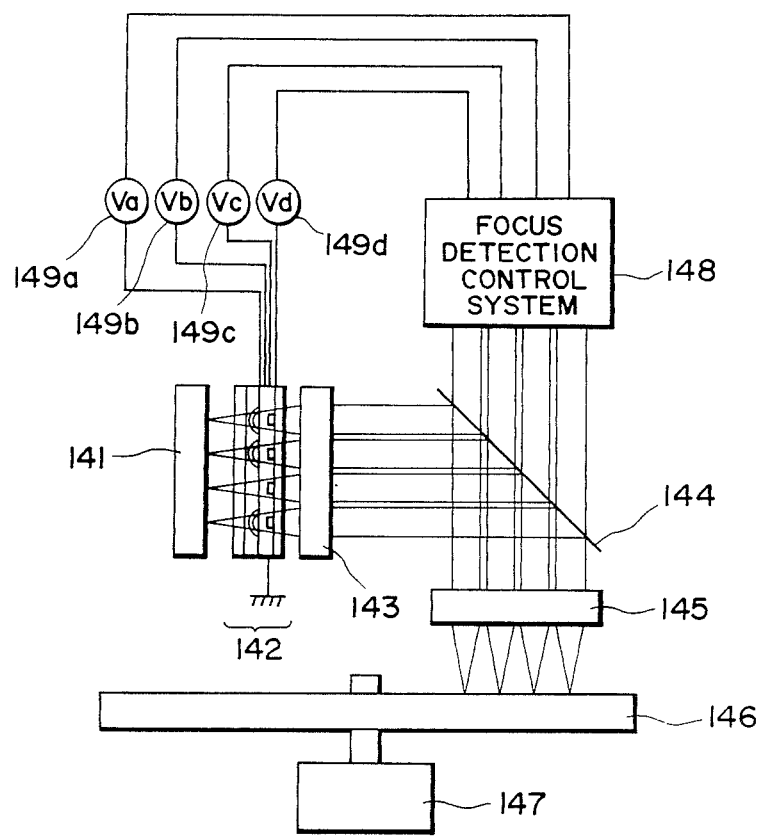
FIG. 24 shows an embodiment in which the array of the optical element of the present invention is used in an optical disk device.

FIG. 24 illustrates an auto-focus optical apparatus for multitracking read-out utilizing the array of the varifocal optical element according to the present invention. In FIG. 24, reference numeral 141 designates an array laser, reference numeral 142 denotes varifocal optical element arrays arranged correspondingly to the respective light-emitting points of the array laser 141, reference numeral 143 designates a collimator lens comprising a SELFOC lens array, reference numeral 144 denotes a half-mirror, reference numeral 145 designates a condenser lens comprising a SELFOC lens array, reference numeral 146 denotes an optical memory disk, reference numeral 147 designates a motor for driving the optical memory disk, reference numeral 148 denotes a focus detection control system capable of independently effecting focus detection control for each condenser lens, and reference characters 149a–149d designate means for applying a voltage to the heat generating resistance member of each of the arrays 142. When the distance between the memory disk 146 and the condenser lens 145 is varied, the heat-generating resistance members in the varifocal optical element arrays 142 are independently heated correspondingly to the light-emitting sources of the array laser, whereby individual auto-focus can be realized for each track. In the embodiment of FIG. 24, a plurality of light-emitting sources like the array laser are used, but a similar effect can be obtained even if the varifocal optical element arrays 142 are disposed in a light beam emitted from a single light source.

Figure 25A:
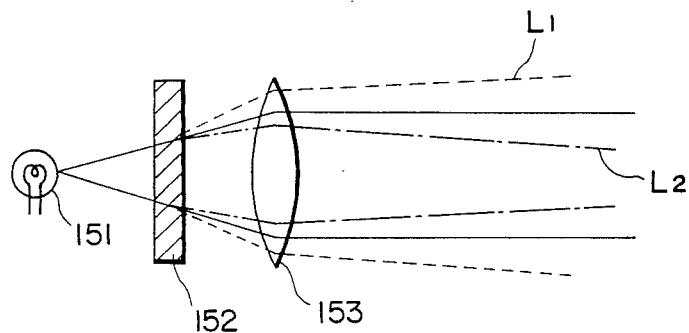
FIGS. 25A, 25B, 26 and 27 show an embodiment in which the optical element of the present invention is used in a light source device.
Figure 25B:
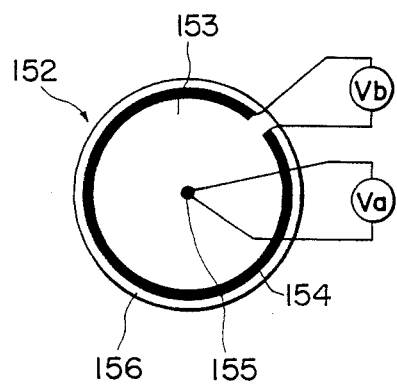

FIGS. 25A and 25B show an embodiment in which the varifocal optical element according to the present invention is applied to a light source device, FIG. 25A being a schematic view of the light source device and FIG. 25B being a schematic front view of the varifocal optical element used in the device. In FIG. 25, reference numeral 151 designates a point light source, and reference numeral 152 denotes a varifocal optical element comprising a transparent thermal effect medium 153, an annular heater 154 provided in the marginal portion of the medium 153, and a heater 155 provided at the center of the medium 153. The construction of this element 152 is similar to the construction of the element shown in FIGS. 2A and 2B. The heaters 154 and 155 are connected to power sources Va and Vb, respectively. Designated by 156 is a lens for condensing the light beam from the light source 151. Usually, the point light source 151 is disposed on one focal plane of the lens 156 and therefore, the lens 156 is used as a collimater lens. The heating device may be provided by applying a light, a laser or the like to the heaters 154, 155 or applying a light, a laser or the like directly to the medium 153.

Operation of the above-described light source device will now be described. In FIG. 25B, when only the power source Va is driven and a voltage is applied to the heater 155, the heater 155 generates heat and in the medium 153, a continuous temperature gradient is obtained from the center thereof (the vicinity of the heater 155) toward the outer periphery thereof. Accordingly, where the variation (dn/dT) in refractive index n at a temperature T of the medium 153 is negative, the refractive index in the medium 153 is progressively increases from the vicinity of the heater 155 toward the outer peripheral portion thereof (toward the heater 154). The gradient of this refractive index becomes approximately constant and thus, this optical element 152 has the function of a concave lens which causes the light beam of the point light source 151 to diverge as indicated by broken line $L_1$ in FIG. 25A.

On the other hand, when only the power source Vb is driven and a voltage is applied to the heater 154, the heater 154 generates heat and accordingly, the refractive index of the medium 153 progressively increases from the vicinity of the heater 154 toward the center thereof (toward the heater 155). Thus, this optical element 152 has the function of a convex lens which converges the light beam of the point light source 151 as indicated by dot-and-dash line $L_2$ in FIG. 25A.

Figure 26:
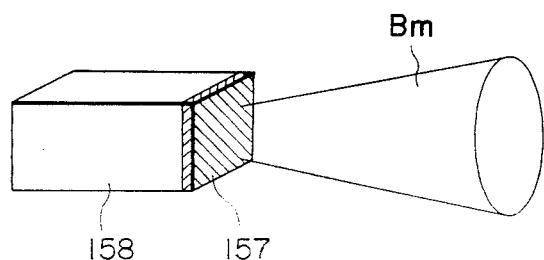

FIG. 26 is a perspective view showing another embodiment of the light source device which is capable of changing the spot diameter of a semiconductor laser by the use of the varifocal optical element according to the present invention. In FIG. 26, reference numeral 157 designates a semiconductor laser, reference numeral 158 denotes a varifocal optical element, and Bm designates a light beam emitted from the laser 157. In the light source device shown in FIG. 26, a heat-generating resistance member (not shown) is caused to generate heat and the refractive index in the medium is made nonuniform, whereby the element 158 comes to have a desired lens function. Accordingly, by suitably forming a heater in the medium, it becomes readily possible to control the expanse of the beam Bm of the semiconductor laser 157 and thereby vary the size of the applied spot, or to correct the beam spot of the semiconductor laser which is elliptical into a circle.

Further, a light-emitting diode printer of a high degree of resolution can be provided by using the varifocal optical element according to the present invention in a light-emitting diode printer. That is, the light beam from a light-emitting diode, like a semiconductor laser, is a light beam having a great diverging angle, and by disposing a varifocal optical element in front of the light-emitting diode to converge the light beam from the light-emitting diode, the light-condensing efficiency on the light-receiving surface can be enhanced. In this case, light-emitting diodes are disposed in an array-like form and therefore, varifocal optical elements may also be formed in an array-like form and may be arranged so as to correspond to the respective light-emitting diodes.

Figure 27:
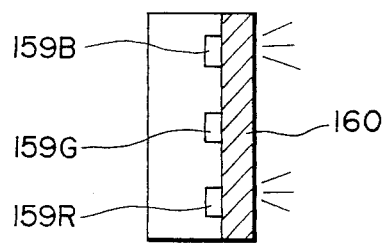

FIG. 27 is a schematic view showing another embodiment of the light source device using the varifocal optical element of the present invention. In the embodiment shown in FIG. 27, a medium 160 having temperature dependence of refractive index is disposed in direct contact with a blue light-emitting diode 159B, a green light-emitting diode 159G and a red light-emitting diode 159R. Light-emitting diodes are generally poor in light-converting efficiency and most of the energy applied thereto is converted into heat and therefore, each diode itself is used also as the heater of the varifocal optical element. The portions of the medium 158 which are near the light-emitting diodes 159B, 159G and 159R rise in temperature due to the heat of the diodes 159 and, where the temperature coefficient dn/dT of refractive index of the medium 160 is negative, the light of each diode 159 diverges and can be utilized for an illuminating system as a light source having uniform brightness. Also, where dn/dT is positive, light of each diode 159 is condensed and can be utilized in a display device of which a high degree of resolution is required.

Figure 28:
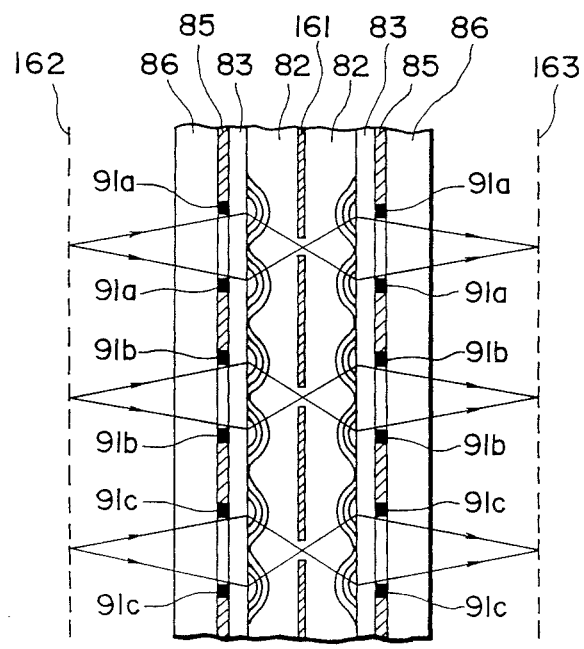
FIG. 28 shows an embodiment in which the optical element of the present invention is used in a reading apparatus.

FIG. 28 shows an example of the reading apparatus to which the varifocal optical element shown in FIGS. 19 and 20 is applied. This reading apparatus is of a construction in which two sets of varifocal optical elements as shown in FIGS. 19 and 20 are disposed at the opposite sides of a stop 161 in opposed relationship with each other. Of the reference numerals given to the varifocal optical elements, those similar to the reference numerals given to the element shown in FIGS. 19 and 20 designate similar members and need not be described herein. By supplying power to heat-generating resistance members 91a, 91b and 91c at a time and causing them to generate a predetermined amount of heat, the index gradient created in the medium 82 creates a convex lens function and the information present on an object surface 162 is imaged as an erect one-to-one magnification image on the image plane 163 by a set of opposed convex lenses. The stop 161 is a field stop for intercepting other stray light than the light in a predetermined field of view.

In the reading apparatus shown in FIG. 28, two varifocal optical elements are disposed at the opposite sides of the stop 161 and in contact with the both sides of the stop, but of course, the two elements may be disposed separately from each other to form a reading apparatus. Such a compound-eye optical system can advantageously be made thin, compact and light in weight as the reading optical system of a copying apparatus, a facsimile apparatus or the like, and also permits various applications by making the most of its characteristic that the lens function is created by power supply only when required.

Figure 29:
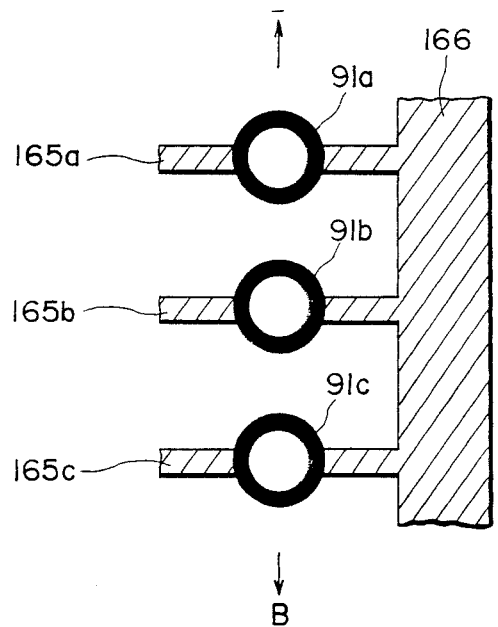
FIGS. 29 and 30 show an embodiment in which the optical element of the present invention is used in an optical shutter.
Figure 30:
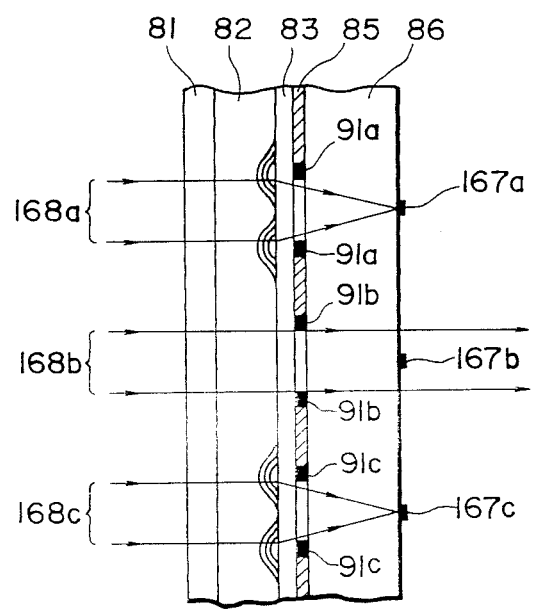

FIGS. 29 and 30 illustrate an embodiment in which the element according to the present invention is utilized in an optical shutter, FIG. 29 being a plan view of the optical shutter and FIG. 30 being a cross-sectional view taken along plane B—B of FIG. 29. In the optical shutter of FIGS. 29 and 30, annular heat-generating resistance members 91a, 91b, are of such a construction that they can be supplied with power independently of one another through electrodes 165a, 165b, . . . and generate heat. Reference numeral 166 designates a common electrode. Reference characters 167a, 167b, . . . denote optical stoppers formed on the rear of a substrate 86. Let it be assumed that a light beam enters from the left of FIG. 30 and that, as shown, the heat-generating resistance members 91a and 91c are generating heat and the heat-generating resistance member 91b is not generating heat. In such a state, incident light beams 168a and 168c are condensed on the optical stoppers 167a and 167c, respectively, by a convex lens function created in the medium 82 and do not emerge rearwardly. On the other hand, an incident light beam 168b travels rectilinearly without being subjected to the convex lens function and passes through the marginal portion of the optical stopper 167b and emerges from the optical shutter. Thus, the optical shutter of this embodiment has the function as an optical shutter or a light valve for intercepting or passing light depending on the presence of the supply of power to the heat-generating resistance members. A further advantage of the present embodiment is that not only light is simply turned on or off but also the quantity of transmitted light can be continuously varied. As already described, the varifocal optical element of the present invention has a light-condensing function as a convex lens and its focal length is variable and therefore, it can control the amount of heat generated by the heat-generating resistance members and vary the converged position of the light beam before and after the optical stoppers, thereby varying the quantity of light emerging rearwardly from the marginal portion of the optical stoppers. If, conversely to FIG. 30, portions corresponding to the optical stoppers 167a, 167b, 167c are made into openings and the other portion is made into a light-intercepting portion, the quantity of light transmitted through the openings corresponding to the portions of the heat-generating resistance members which are supplied with power will be increased and it will become possible to effect even a modulation having a relation of negative-to-positive inversion with FIG. 30. Again in this case, similarly to the embodiment of FIG. 30, the quantity of emergent light can be continuously varied by controlling the amount of generated heat.

Figure 31:
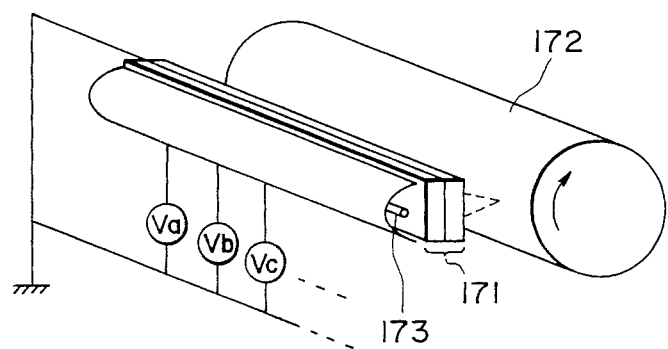
FIG. 31 shows an optical shutter array using the optical element of the present invention as applied to an electrostatic recording apparatus.

FIG. 31 is a schematic view illustrating an example in which the optical shutter shown in FIGS. 29 and 30 is applied to a printer. In FIG. 31, reference numeral 171 designates the optical shutter array shown in FIGS. 29 and 30, and reference numeral 172 denotes an electrophotographic photosensitive medium. Voltages Va, Vb, . . . can be independently applied to the individual heat-generating resistance members (not shown) in the optical shutter array 171 in accordance with a signal input by signal input means, not shown, and by these applied voltages, only the portions corresponding to the heat-generating resistance members can pass or intercept the light beam from a light source portion 173, and in accordance therewith, an electrostatic latent image is formed on the photosensitive medium 172. Thereafter, the latent image can be visualized and printed through a conventional electrophotographic process (not shown). Further, by making the light source portion 173 and the optical shutter array 171 integral with each other, there can be provided a more compact printer apparatus.

Figure 32:
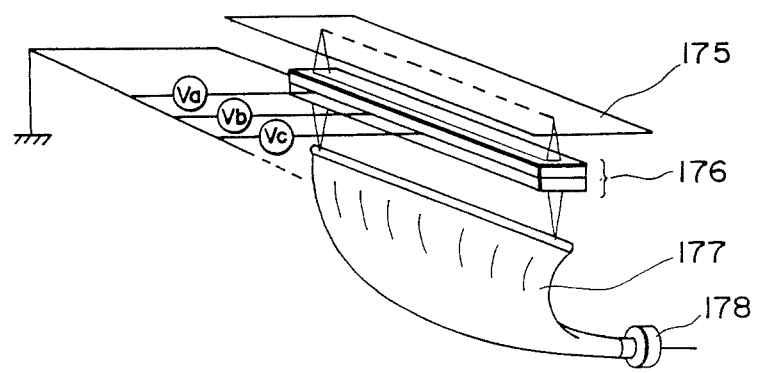
FIG. 32 shows an optical shutter array using the optical element of the present invention as applied to a reading apparatus.

FIG. 32 illustrates an example in which the varifocal optical element of the present invention is applied to the reading optical system of a copying apparatus, a facsimile apparatus or the like. In FIG. 32, reference numeral 175 designates an object to be read, reference numeral 176 denotes the optical shutter array of the embodiment described in connection with FIGS. 29 and 30, reference numeral 177 designates an optical fiber tube having one end thereof widened in the array direction of the optical shutter array 176, and reference numeral 178 denotes a photosensor. Voltages Va, Vb, Vc, . . . are applied to the individual heat-generating resistance members (not shown) in the optical shutter array 176 by voltage applying means, and by the applied voltages, only the corresponding portions of the heat-generating resistance members transmit light therethrough. The transmitted light is converted into an electrical signal by the photosensor 178 through the optical fiber tube 177, and the electrical signal is transmitted to a memory, not shown, a signal transmitting mechanism or the like, in conformity with the usage thereof.

What is claimed is:

1. An optical element having a variable focal length, comprising:
    a medium the refractive index of which varies with temperature, said medium passing an incident light beam therethrough;
    a plurality of independently controllable heating means for imparting heat to said medium to create a single continuous index gradient due to a temperature distribution resulting in said medium as a consequence of heat being imparted thereto, wherein said plurality of independently controllable heating means comprise an annular heater and a central heater provided at the center of said annual heater, wherein the heating of said annular heater and said central heater is capable of being selectively controlled by control means to thereby produce concave and convex lens functions of the index gradient formed in said medium, and wherein said plurality of independently controllable heating means is disposed in a plane crossing the light beam; and
    control means for independently controlling the amount of heat being imparted to said medium by each of said plurality of heating means to vary the shape of the index gradient formed in said medium.

2. An optical element the focal length of which is variable, said element comprising:
    a medium the refractive index of which varies with temperature, said medium defining a light beam incident plane and passing a light beam therethrough;
    a plurality of heating means for respectively imparting heat to different portions of said medium to form a plurality of index gradients in said medium, said plurality of heating means being disposed in a plane crossing the light beam;
    means for controlling the amount of heat imparted by said plurality of heating means; and
    means for selectively illuminating areas of said light beam incident plane excluding at least those areas in which said plurality of heating means lie.

3. An optical element according to claim 2, wherein said plurality of heating means comprise ring-shaped heat-generating resistance members imparting amounts of heat which are electrically controllable by said controlling means.

4. An optical element according to claim 3, further comprising a plurality of light-intercepting means provided correspondingly with said plurality of heating means, said light-intercepting means being formed to intercept the passing of the light beam that has passed through said ring-shaped resistance member when a corresponding one of said plurality of heating means is in a heated condition and to permit the passing of the light beam that has passed through said ring-shaped resistance member when a said corresponding one of said plurality of heating means is in an unheated condition.

5. An optical device comprising:
    a light source;
    a light receiving surface for receiving a light beam from said light source;
    spot forming means for forming a beam spot on said light receiving surface by use of a light beam from said light source;
    scanning means for relatively scanning the beam spot formed by said spot forming means on said light receiving surface;
    a medium the refractive index of which varies with temperature, said medium being disposed at a position where the light beam from said light source enters between said light source and said light receiving surface;
    heating means for applying heat to said medium in order to generate a refractive index distribution accompanied with a temperature distribution in said medium; and
    controlling means for controlling said heating means so as to vary a diameter of said beam spot, scanned on said light receiving surface, by varying said refractive index distribution in said medium.

6. An optical device according to claim 5, wherein said light receiving surface comprises a photosensitive body.

7. An optical device according to claim 6, wherein recording is performed on said photosensitive body by scanning by use of said scanning means.

8. An optical device according to claim 7, wherein said controlling means records a change of a density of the beam spot by changing said diameter of the beam spot.

9. An optical device according to claim 8, wherein said light source comprises a semiconductor laser.

* * * * *